(12) United States Patent
Lee et al.

(10) Patent No.: US 9,703,109 B2
(45) Date of Patent: Jul. 11, 2017

(54) THREE-DIMENSIONAL IMAGE DISPLAY DEVICE

(75) Inventors: Mingyu Lee, Paju-si (KR); Hoon Kang, Namyangju-si (KR); Jinman Bae, Incheon (KR)

(73) Assignee: LG Display Co., Ltd., Seoul (KR)

( * ) Notice: Subject to any disclaimer, the term of this patent is extended or adjusted under 35 U.S.C. 154(b) by 1017 days.

(21) Appl. No.: 12/643,255

(22) Filed: Dec. 21, 2009

(65) Prior Publication Data
US 2011/0050871 A1  Mar. 3, 2011

(30) Foreign Application Priority Data
Sep. 3, 2009  (KR) .................. 10-2009-0082988

(51) Int. Cl.
*G02B 27/26* (2006.01)
(52) U.S. Cl.
CPC .................... *G02B 27/26* (2013.01)
(58) Field of Classification Search
CPC .................................... G02B 27/26
USPC ........................................ 348/58
See application file for complete search history.

(56) References Cited

U.S. PATENT DOCUMENTS

| | | | | |
|---|---|---|---|---|
| 6,084,647 A | * | 7/2000 | Hatano et al. | 349/15 |
| 7,022,911 B1 | * | 4/2006 | Anderson | 174/350 |
| 2005/0104828 A1 | * | 5/2005 | Lee et al. | 345/87 |
| 2006/0040520 A1 | * | 2/2006 | Moh | 439/66 |
| 2008/0298003 A1 | * | 12/2008 | Pyo | 361/681 |

\* cited by examiner

*Primary Examiner* — Mikhail Itskovich
(74) *Attorney, Agent, or Firm* — Morgan, Lewis & Bockius LLP

(57) ABSTRACT

A three-dimensional (3D) image display device includes a display panel including an upper substrate and a lower substrate, the display panel displaying a left eye image and a right eye image; a patterned retarder that applies first and second circular polarizations to the light corresponding to the left and right eye images, respectively; a conductive tape attached to the upper substrate to discharge static electricity from the display panel; a panel guide on which the display panel and the patterned retarder are mounted; an electrically conductive gasket disposed on the panel guide in contact with the conductive tape; and a top case disposed on the panel guide and the conductive gasket such that the conductive gasket electrically connects the conductive tape to the top case.

2 Claims, 3 Drawing Sheets

THREE-DIMENSIONAL IMAGE DISPLAY DEVICE

The present invention claims the benefit of Korean Patent Application No. 10-2009-082988 filed in the Republic of Korea on Sep. 3, 2009, which is hereby incorporated by reference.

BACKGROUND OF THE INVENTION

Field of the Invention

The present invention relates to a display device, and more particularly, to a three-dimensional (3D) image display device for displaying a three-dimensional stereoscopic image.

Discussion of the Related Art

A three-dimensional (3D) image display device (i.e., a stereoscopic image display device) displays a 3D image using a stereoscopic technique or an autostereoscopic technique.

The stereoscopic technique, which uses a parallax image of left and right eyes of a user with a high stereoscopic effect, includes a glass method and a non-glass method both of which have been put to practical use. In the glass method, a left and right parallax image is displayed on a direct view-based display device by changing a polarization direction of the left and right parallax image, and a stereoscopic image is implemented using polarized glasses. In the non-glass method, an optical plate, such as a parallax barrier or the like, for separating an optical axis of the left and right parallax image is installed in front of or behind a display screen.

As shown in FIG. 1, the glass method may employ a patterned retarder 3 for converting polarization characteristics of light incident on the polarization glasses (not shown) on a display panel 2. In the glass method, a left eye image and a right eye image are alternately displayed on the display panel 2, and the polarization characteristics of light incident on the polarized glasses are converted by the patterned retarder 3. Through this operation, the glass method implements a 3D image by spatially dividing the left eye image and the right eye image. In FIG. 1, a backlight unit 1 irradiates light to the display panel 2.

As shown in FIG. 2, the display panel 2 includes an upper substrate 2A and a lower substrate 2B. A polarization film (POL) is attached to an upper surface of the upper substrate 2A that on a die does not face the lower substrate 2B. Another polarization film POL is attached to a lower surface of the lower substrate 2B on a side that does not face the upper substrate 2A. The patterned retarder 3 is attached on the polarization film POL of the upper substrate 2A. The display panel 2 to which the patterned retarder 3 is attached is mounted at a stepped inner wall of a panel guide 4 made of a non-conductive material. The backlight unit 1 is received in a bottom cover 5 made of a metal material and disposed under the display panel 2. A top case 6 is made of a metal material and covers an upper edge of the patterned retarder 3, upper and side surfaces of the panel guide 4, and a side surface of the bottom cover 5. The panel guide 4, the bottom cover 5, and the top case 6 are fastened by a screw 8 that penetrates them.

An electrostatic discharge (ESD) conductive tape 7 is attached to an upper surface of the upper substrate 2A on a side that does not face the lower substrate 2B to externally discharge static electricity generated from the display panel 2. The conductive tape 7 is attached to an ESD transparent conductive film (not shown) formed on the upper surface of the upper substrate 2A and then extends so as to be attached to the upper and side surfaces of the panel guide 4 and to the side surface of the bottom cover 5. Static electricity generated from the display panel 2 is transferred to the bottom cover 5 through the conductive tape 7, and then externally discharged through the screw 8 and the top case 6. However, the 3D display device has the following problems.

First, the ESD structure of the related art 3D image display device cannot flexibly cope with a repair process. If the display panel or the backlight unit is found to be defective, the display panel or the backlight unit is separated after assembly of the 3D image display device is completed, and a repair process is performed on the separated display panel or the backlight. In this case, to separate the display panel or the backlight unit, the conductive tape must be detached from the panel guide and the bottom cover. After the repair process is performed, a conductive force of the conductive tape is drastically degraded as compared with the state before the repair process. That is, if the conductive tape is detached and then reattached, its adhesive power is much degraded as compared with its adhesive power before being detached. In addition, because the attachment portions of the conductive tape and the display panel are covered by the patterned retarder, it is not possible to replace only the conductive tape. That is, the need to remove the patterned retarder prevents replacement of the conductive tape without damaging the display panel. The weakened conductive power of the conductive tape after the repair process degrades the ability to ground the ESD.

Second, the ESD structure of the related art 3D image display device should necessarily perform the assembling process of extending the conductive tape and attaching it to the upper and side surfaces of the panel guide and the side surface of the bottom cover, a process TACT time (total average cycle time) is lengthened, and thus, an assembly efficiency is lowered. In addition, static electricity generated from the display panel is externally discharged through the conductive tape, the bottom cover, the screw, and the top case, so the discharge path is very long, which inevitably degrades discharge efficiency.

SUMMARY OF THE INVENTION

Accordingly, the present invention is directed to a three-dimensional (3D) image display device that substantially obviates one or more of the problems due to limitations and disadvantages of the related art.

An object of the present invention is to provide a 3D image display device wherein ground characteristics of a conductive tape are not degraded by a repair process.

Another object of the present invention is to provide a 3D image display device wherein a discharge path is reduced.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a three-dimensional (3D) image display device comprises a display panel including an upper substrate and a lower substrate, the display panel displaying a left eye image and a right eye image; a patterned retarder that applies first and second circular polarizations to the light corresponding to the left and right eye images, respectively;

a conductive tape attached to the upper substrate to discharge static electricity from the display panel; a panel guide on which the display panel and the patterned retarder are mounted; an electrically conductive gasket disposed on the panel guide in contact with the conductive tape; and a top case disposed on the panel guide and the conductive gasket such that the conductive gasket electrically connects the conductive tape to the top case.

In another aspect, an image display device comprises a display panel including at least an upper substrate; an electrically conductive element attached to the upper substrate to discharge electrical charge from the display panel; a panel guide on which the display panel is mounted; a top case disposed with a periphery of the display panel held between the panel guide and the top case; and a conductive gasket disposed between the panel guide and the top case above the conductive element to electrically connect the conductive element and the top case.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the preferred embodiments of the present invention, examples of which are illustrated in the accompanying drawings. Hereinafter, exemplary embodiments of the present invention will now be described with reference to FIGS. 3 to 5.

Figure 1:
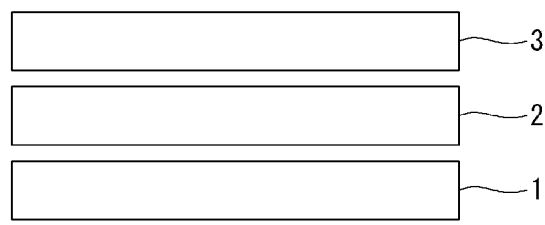
FIG. 1 schematically shows a glass-type three-dimensional (3D) image display device according to the related art.
Figure 2:
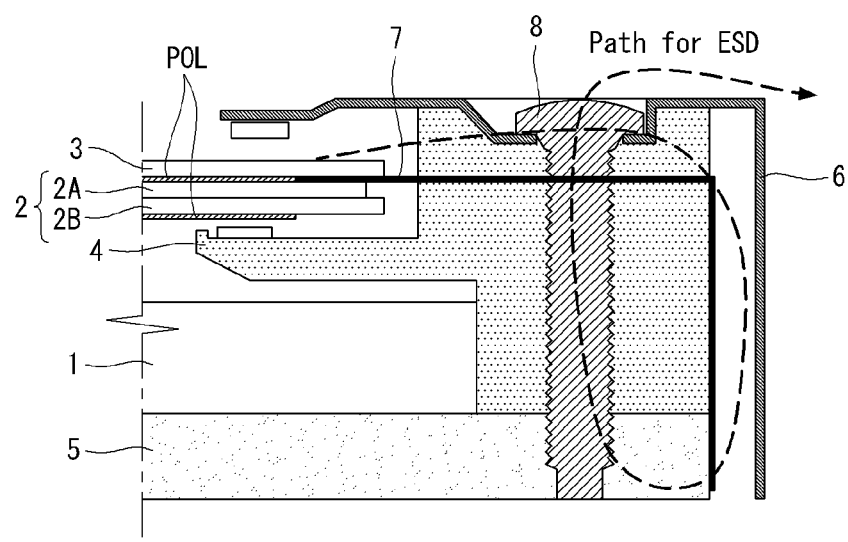
FIG. 2 is a sectional view for explaining a static electricity discharge path in a 3D image display device according to the related art.
Figure 3:
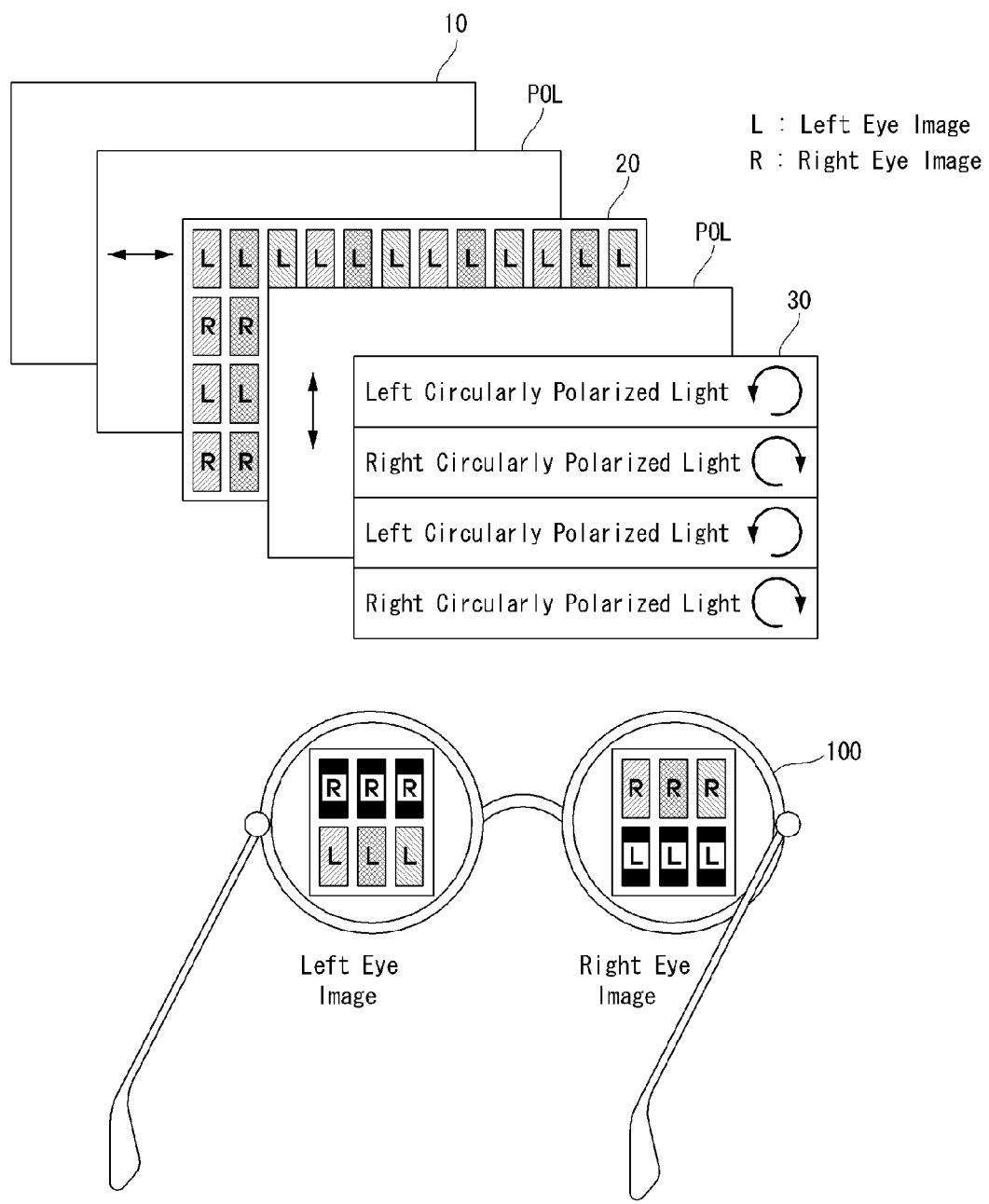
FIG. 3 is a schematic block diagram of a 3D image device according to an exemplary embodiment of the present invention.

As shown in FIG. 3, the 3D image display device according to an exemplary embodiment of the present invention includes a backlight unit 10, a display panel 20, a polarization film POL, a patterned retarder 30 and polarized glasses 100.

The display panel 20 is implemented as a liquid crystal display panel. Alternatively, the display panel 20 may be implemented as a display panel of any other flat panel display device, such as an organic light emitting diode (OLED), a field emission display (FED), a plasma display panel (PDP), or the like.

The display panel 20 includes a lower substrate with thin film transistor (TFT) array formed thereon, an upper substrate with color filter array formed thereon, and a liquid crystal layer interposed between the lower and upper substrates. A polarization film POL is attached to a lower surface of the lower substrate facing the backlight unit 10. An alignment film for setting a pre-tilt angle of liquid crystal is formed on an interface in contact with the liquid crystal layer. A polarization film POL is attached to an upper surface of the upper substrate facing the patterned retarder 30. An alignment film for setting a pre-tilt angle of liquid crystal is formed on the interface in contact with the liquid crystal layer.

Data lines, to which data voltages are supplied, and gate lines, to which gate pulses in synchronization with the data voltages are sequentially supplied, are formed on the lower substrate crossing each other. A pixel electrode is formed at each crossing of the data lines and the gate lines in a pixel array area of the lower substrate for an image display. The pixel electrode is connected with a TFT of the TFT array and receives a data voltage from the data line. The pixel electrode, facing a common electrode to which a common voltage is applied, applies an electric field to the liquid crystal layer. In a vertical field driving mode, such as a twisted nematic (TN) mode and a vertical alignment (VA) mode, the common electrode is formed on the upper substrate, and in a horizontal field driving mode, such as an in-plane switching (IPS) mode and a fringe field switching (FFS) mode, the common electrode is formed together with pixel electrodes on the lower substrate. Data pads extending from the data lines and gate pads extending from the gate lines are formed on pad area outside the pixel array area on the lower substrate. The data pads are electrically connected with a source integrated circuit (IC) and the gate pads are electrically connected with a gate IC. The source IC is mounted on a tape film type source tape carrier package (TCP), which is then connected to the data pads through a tape automated bonding (TAB) process using an anisotropic conductive film. The gate IC is mounted on a tape film type gate TCP, which is then connected to the gate pads through the TAB process using an anisotropic conductive film. In forming the pad area, the lower substrate is generally formed to be larger than the upper substrate.

An ESD conductive tape is attached to an upper surface of the upper substrate that does not face the lower substrate to discharge static electricity generated from the display panel 20 to the outside. The conductive tape is attached to an ESD transparent conductive film formed on the upper surface of the upper substrate and then extends to an upper surface of a panel guide. The conductive tape is in contact with a conductive gasket attached to an inner wall of a top case. A discharge path through the conductive tape according to an exemplary embodiment of the present invention will be described in detail later with reference to FIGS. 4 and 5.

A left-eye image (L) and a right-eye image (R) are alternately displayed line by line on the display unit 20.

The polarization film POL is an analyzer attached between the lower substrate of the display panel 20 and the backlight unit 10, and also attached between the upper surface of the display panel 20 and the patterned retarder 30, thereby allowing only particular linearly polarized light among light incident into the polarization film POL to be transmitted therethrough. An optical axis of the polarization film POL attached between the lower substrate of the display panel 20 and the backlight unit 10 and that of the polarization film POL attached between the upper substrate of the display panel 20 and the patterned retarder 30 may be perpendicular each other.

The patterned retarder 30 is attached to a transparent substrate made of glass as a base layer on the polarization film POL of the upper substrate. For this, a UV-curable resin such as acrylate esters, acrylate urethanes, mercaptons & photoinitiator, or the like is mainly used. The patterned retarder 30 includes a reflection film, two or more alignment keys for alignment with the display panel 20 when attached, and first and second retarder patterns formed alternately line by line. The patterned retarder 30 may further include a black stripe pattern, as needed.

The alignment keys are made of the same material as that of the first and second retarder patterns formed at area corresponding to an image display part, and are formed at the same time when the first and second retarder patterns are formed. The reflection film overlaps with the alignment keys, and is larger than the alignment keys. A plurality of alignment marks are formed on the pad area of the lower substrate such that they correspond to the alignment keys in a one-to-one manner. The alignment marks may be formed at a horizontal lower end or horizontal upper end of the upper substrate as the need arises. Korean Patent Application No. 10-2008-0055428 filed by the assignee of the present application discloses an alignment process using the alignment marks/keys and a vision system. The black stripe pattern prevents the occurrence of a phenomenon that the left-eye image and the right-eye image are seen to overlap with each other, namely, crosstalk.

Each of the retarder patterns formed at an area corresponding to the image display part delays the phase of light by X (wavelength)/4 using a birefringence medium. The optical axis of the first retarder pattern and that of the second retarder pattern are perpendicular each other. Accordingly, the first retarder pattern is disposed to face lines where the left-eye image is displayed on the display unit 20 to convert light of the left-eye image into left circularly polarized light (or right-circuit polarized light). The second retarder pattern is disposed to face lines where the right-eye image is displayed on the display panel 20 to convert light of the right-eye image into right circularly polarized light (or left circularly polarized light).

When the patterned retarder 30 is attached with the display panel 20, only the source TCP part (hereinafter, referred to as a 'source TAB') to which the source IC and the data pads are connected is exposed, or both the source TAB and a gate TCP part (referred to as a 'gate TAB', hereinafter) to which the gate IC and the gate pads are connected may be exposed.

For the former case, a vertical size of the patterned retarder 30 is smaller than that of the lower substrate, and equal to a vertical size of the upper substrate (i.e., a vertical size of the pixel array area). A horizontal size of the patterned retarder 30 is equal to that of the lower substrate. With this configuration, good vibration resistance and good impact resistance can be obtained, and, if the source TAB is damaged or defective after the patterned retarder 30 is attached with the display panel 20, the source TAB can be repaired.

For the latter case, the vertical size of the patterned retarder 30 is smaller than that of the lower substrate and equal to the vertical size of the upper substrate (i.e., the vertical size of the pixel array area). Also, the horizontal size of the patterned retarder 30 is smaller than that of the lower substrate and equal to the horizontal size of the upper substrate (i.e., the horizontal size of the pixel array area). With this configuration, if the source TAB and/or the gate TAB are damaged or defective after the patterned retarder 30 is attached with the display panel 20, the source TAB and/or the gate TAB can be repaired. Korean Patent Application No. 10-2009-0070791 filed by the assignee of the present application discloses the adjustment of the size of the patterned retarder 30.

Meanwhile, in the state that the patterned retarder 30 is attached with the display panel 20, it may cover the source TAB and the gate TAB. To this end, the vertical and horizontal sizes of the patterned retarder 30 may be equal to those of the lower substrate, respectively. In this case, it would be difficult to repair the source TAB and the gate TAB as necessary, but a high vibration-resistance and impact-resistance can be reliably secured.

The backlight unit 10 includes one or more light sources and a plurality of optical members that convert light from the light sources into planer light sources and irradiate the same to the display panel 20. The light source may include one or more of the light sources among HCFL (Hot Cathode Fluorescent Lamp), CCFL (Cold Cathode Fluorescent Lamp), EEFL (External Electrode Fluorescent Lamp), FFL (Flat Fluorescent Lamp), LED (Light Emitting Diode). The optical members, including a prism sheet, a diffusion sheet, or the like, increase a planer uniformity of light from the light sources. The optical members may include a light guide plate (forming an edge-type backlight unit) and may include a diffuser (forming a direct type backlight unit) as the need arises.

A polarization film allowing only left circularly polarized light (or right circularly polarized light) to pass therethrough is attached to the left eye of the polarization glasses 100, and a polarization film allowing only right circularly polarized light (or left circularly polarized light) to pass therethrough is attached to the right eye of the polarized glasses 100. Accordingly, an observer (i.e., a user) wearing the polarized glasses 100 can view only the left-eye image with his left eye and only the right-eye image with his right eye, feeling the image displayed on the display panel 20 as a stereoscopic (3D) image.

Figure 4:
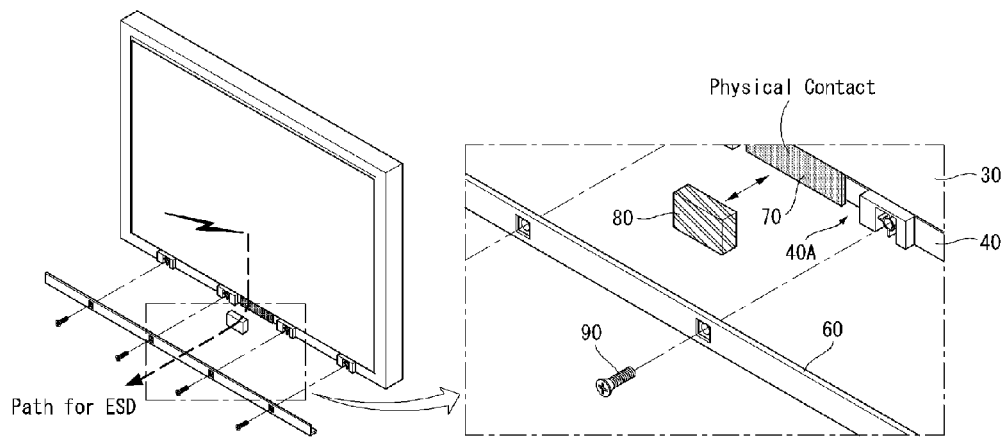
FIG. 4 is a perspective view showing an assembly process the 3D image display device according to an exemplary embodiment of the present invention.
Figure 5:
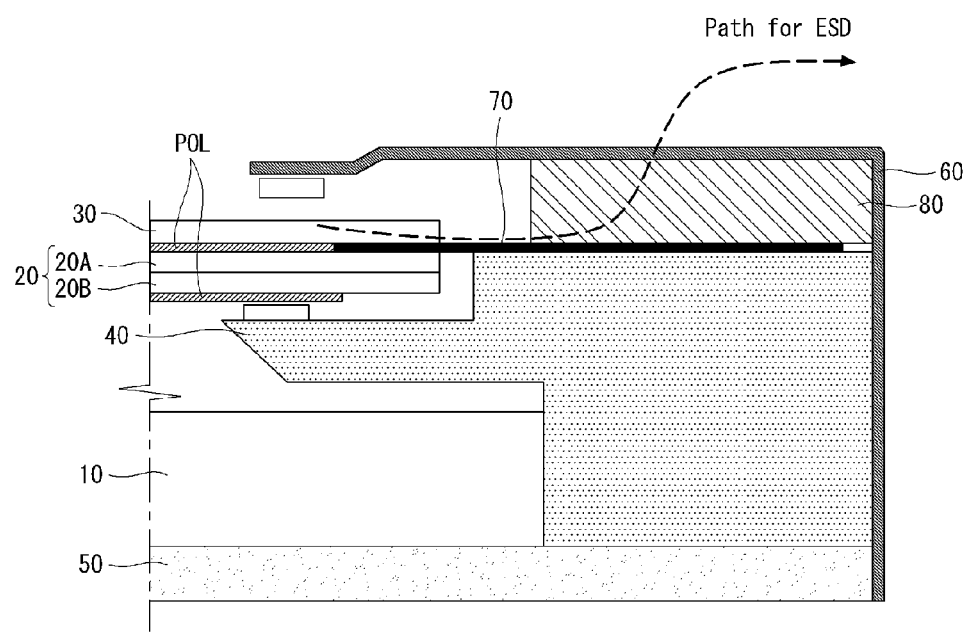
FIG. 5 is a sectional view showing the 3D image display device according to an exemplary embodiment of the present invention.

FIG. 4 is a perspective view showing the fastening of the top case to be brought into contact with the conductive tape to form a static electricity discharge path. FIG. 5 is a sectional view showing one side of the assembly-completed 3D image display device.

With reference to FIGS. 4 and 5, the display panel 20 to which the patterned retarder 30 is attached is mounted on a stepped inner wall of a panel guide 40 made of a non-conductive material. As shown in FIG. 4, a recess 40A is formed on an upper surface of a lower end portion of the panel guide 40 adjacent to a bottom edge of the display panel 20 and is covered by the top case 60. Alternatively, the recess 40A can be formed at other positions such as the upper end portion of the panel guide 40 adjacent to a top edge portion of the display panel 20. A conductive tape 70 is attached to an ESD transparent conductive film of the upper substrate 20A and extends onto the recess 40A. Preferably, the conductive tape 70 is attached by avoiding the region where the source TAB is formed (i.e., the upper end portion of the display panel 20) or the region where the gate TAB is formed (i.e., the left and right end portions of the display panel 20) so that the conductive tape 70 may be attached to the lower end portion of the display panel 20. The backlight unit 10 is received in a bottom cover 50 made of a metal material and disposed below the display panel 20. The top case 60, made of a metal material, covers edges of the upper surface of the patterned retarder 30, the upper and side surfaces of the panel guide 40, and the side of the bottom cover 50. The top case 60, the panel guide 40, and the bottom cover 50 may be fastened by means of a screw 90.

A conductive gasket 80 made of a conductive material is attached to an inner wall of the top case 60 such that it corresponds to the recess 40A of the panel guide 40. When fastening operation is made using the screw 90, the conductive gasket 80 presses the conductive tape 70 on the recess 40A, making the top case 60 and the conductive tape 70 electrically connected with each other. Static electricity generated in the display panel 20 is discharged to outside immediately via the conductive tape 70, the conductive gasket 80, and the top case 60, without passing through the bottom cover 50 and the screw 90. Accordingly, the discharge path is very short compared with the related art. As a result, the discharge efficiency according to the exemplary embodiment of this document is significantly improved as compared with the related art.

In addition, the other remaining portions of the conductive tape 70 excluding the portion attached to the ESD transparent conductive film of the upper substrate 20A, do not have an adhesive strength. Namely, the conductive tape 70 has a structure to be placed on the recess 40A to physically contact the conductive gasket 80, rather than being stuck (i.e., adhered) to the recess 40A. That is, an adhesive is not needed for the conductive gasket 80. Thus, although the display panel 20 or the backlight unit 10 is detached, on which a repairing process is performed as necessary, and the 3D image display device is reassembled, such a problem as in the related art in which the adhesive strength of the conductive tape 70 is weakened to degrade ground ability does not arise. In addition, according to an exemplary embodiment of this document, the conductive tape 70 extends only up to the recess 40A of the panel guide 40, the length of the conductive tape 70 can be considerably reduced compared with the related art in which the conductive tape 70 extends to the bottom cover, and also, because the conductive tape 70 is not necessarily attached to the panel guide 40 and the bottom cover 50, the operability (i.e., workability) in relation to an assembling efficiency and assembling time can be drastically improved.

As described above, in the 3D image display device according to exemplary embodiments of present invention, the conductive tape is electrically connected with the top case via the conductive gasket which physically presses on the conductive tape. Therefore, a repairing process can be flexibly performed without degrading the grounding characteristics of the conductive tape. Moreover, the discharge efficiency can be greatly enhanced by reducing the discharge path.

It will be apparent to those skilled in the art that various modifications and variation can be made in the three-dimensional (3D) image display device of the present invention without departing from the spirit or scope of the invention. Thus, it is intended that the present invention cover the modifications and variations of this invention provided they come within the scope of the appended claims and their equivalents.

What is claimed is:

1. A three-dimensional (3D) image display device, comprising:
    a display panel including an upper substrate and a lower substrate, the display panel displaying a left eye image and a right eye image;
    a patterned retarder that applies first and second circular polarizations to the light corresponding to the left and right eye images, respectively;
    a panel guide on which the display panel and the patterned retarder are mounted;
    a conductive tape attached to one surface of the upper substrate and the upper surface of the panel guide excluding side surfaces of the panel guide to discharge static electricity from the display panel, wherein the conductive tape is press connected to the panel guide without an adhesive therebetween;
    an electrically conductive gasket disposed on the panel guide in contact with the conductive tape;
    a top case directly contacted to the conductive gasket such that the conductive gasket electrically connects the conductive tape to the to case; and
    a plurality of screws configured to fasten the to case to the panel guide and to be separated from the conductive tape, wherein the conductive gasket is disposed between adjacent screws,
    wherein the conductive gasket is disposed between the conductive tape and the top case, and
    wherein one surface of the conductive gasket is partially and directly contacted with the conductive tape which is directly contacted with the upper surface of the panel guide without overlapping the display panel, and another surface of the conductive gasket is entirely and directly contacted with the to case.

2. An image display device, comprising:
    a display panel including at least an upper substrate;
    an electrically conductive element directly attached to one surface of the upper substrate;
    a panel guide on which the display panel is mounted;
    a top case disposed with a periphery of the display panel held between the panel guide and the top case;
    a conductive gasket disposed between the conductive element and the top case and
    having one surface directly contacted with the conductive element and another surface directly contacted with the to case to electrically connect the conductive element to the top case; and
    a plurality of screws configured to fasten the to case to the panel guide and to be separated from the conductive element, wherein the conductive gasket is disposed between adjacent screws,
    wherein the conductive gasket is disposed between the conductive element and the top case,
    wherein one surface of the conductive gasket is partially and directly contacted with the conductive element which is directly contacted with the upper surface of the panel guide without overlapping the display panel, and another surface of the conductive gasket is entirely and directly contacted with the top case, and
    wherein the conductive element is press connected to the panel guide without an adhesive therebetween.

* * * * *